(12) United States Patent
Xu et al.

(10) Patent No.: US 11,128,199 B2
(45) Date of Patent: Sep. 21, 2021

(54) GENERATOR MOUNTED ON ROTATING OBJECT

(71) Applicant: CITIC Dicastal CO., LTD., Hebei (CN)

(72) Inventors: Zuo Xu, Qinhuangdao (CN); Shiwen Xu, Qinhuangdao (CN); Minglei Li, Qinhuangdao (CN); Yao Dai, Qinhuangdao (CN); Shaoqian Wang, Qinhuangdao (CN); Weidong Liu, Qinhuangdao (CN); Xi Li, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 0 days.

(21) Appl. No.: 16/804,827

(22) Filed: Feb. 28, 2020

(65) Prior Publication Data
US 2021/0167664 A1 Jun. 3, 2021

(30) Foreign Application Priority Data
Dec. 3, 2019 (CN) .......................... 201911222542.2

(51) Int. Cl.
*H02K 7/18* (2006.01)
*H02K 1/17* (2006.01)
*H02K 1/22* (2006.01)

(52) U.S. Cl.
CPC ............. *H02K 7/1846* (2013.01); *H02K 1/17* (2013.01); *H02K 1/22* (2013.01)

(58) Field of Classification Search
CPC ........... H02K 7/1846; H02K 1/22; H02K 1/17
See application file for complete search history.

(56) References Cited

U.S. PATENT DOCUMENTS

| 2006/0049705 A1* | 3/2006 | Matsubara | H02K 7/063 310/81 |
| 2012/0049524 A1* | 3/2012 | Nikolic | B60L 53/00 290/50 |
| 2017/0353092 A1* | 12/2017 | Park | H02K 3/487 |

\* cited by examiner

*Primary Examiner* — Thomas Truong
(74) *Attorney, Agent, or Firm* — Cooper Legal Group, LLC

(57) ABSTRACT

A generator mounted on a rotating object includes a rotor mounted and fixedly arranged on the rotating object, and the rotor including at least one induction coil; a stator capable of rotating relative to the rotor, and the stator including at least two magnetic poles; the stator including a stator shell and a balancing weight, and the stator shell encircling the rotor from the circumferential direction of the rotor and being closed in the circumferential direction; and the balancing weight being fixedly arranged at one side of the stator shell, and the angle range of the balancing weight in the circumferential direction being smaller than or equal to 180 DEG.

9 Claims, 5 Drawing Sheets

GENERATOR MOUNTED ON ROTATING OBJECT

CROSS-REFERENCE TO RELATED APPLICATIONS

The present application claims benefit of Chinese Patent Application No. 201911222542.2, filed on Dec. 3, 2019, the contents of which are hereby incorporated by reference in its entirety.

BACKGROUND

With the development of economy and the progress of science and technologies, intelligent transportation has become an important development direction of human life, and how to dynamically acquire information of various parts of a vehicle is an important link of the intelligent transportation. For example, acquiring information of a wheel in a running process can ensure that the vehicle runs more safely. What's more for example, the side of the wheel may be provided with a display screen by which information, etc. required to be displayed by a driver is displayed.

However, facilities or display screens, etc. for acquiring wheel information at present are almost some electronic products all of which work depending on electric energy, while there is a certain difficulty in continuously and reliably supplying power in a process that a wheel continuously runs.

SUMMARY

The present disclosure relates to the technical field of generators and specifically relates to a generator mounted on a rotating object.

For this purpose, an embodiment of the present disclosure expects to provide a generator mounted on a rotating object, capable of continuously and reliably supplying power to an electronic product on a wheel.

In order to achieve the above-mentioned aim, an embodiment of the present disclosure provides a generator mounted on a rotating object, and the generator includes:

a rotor mounted and fixedly arranged on the rotating object, and the rotor including at least one induction coil;

a stator capable of rotating relative to the rotor, and the stator including at least two magnetic poles;

the stator including a stator shell and a balancing weight, and the stator shell encircling the rotor from the circumferential direction of the rotor and being closed in the circumferential direction; the balancing weight being fixedly arranged at one side of the stator shell, and the angle range of the balancing weight in the circumferential direction being smaller than or equal to 180 DEG; and when the rotating object rotates, the rotor rotating with the rotation of the rotating object, while the stator being kept still under the action of the gravity of the balancing weight.

In the above-mentioned solution, the balancing weight is made of a tungsten alloy.

In the above-mentioned solution, the stator shell includes a base ring and at least two magnetic pole blocks, and the magnetic pole blocks are uniformly and fixedly arranged on the inner wall of the base ring via a binder.

In the above-mentioned solution, the magnetic pole blocks are distributed on the inner wall of the base ring in a wave shape, and each wave peak in the wave shape includes one magnetic pole block; and the magnetic pole blocks are uniformly distributed on the circumference of the inner wall of the base ring.

In the above-mentioned solution, the magnetic pole blocks are made of NdFeB.

In the above-mentioned solution, the induction coils are made of pure copper conductors.

In the above-mentioned solution, the rotor further includes a rotor core, the rotor core includes at least two coil slots for accommodating the induction coils, and each of the induction coils is wound in two or more adjacent coil slots; and the number of the coil slots corresponds to the number of the magnetic pole blocks.

In the above-mentioned solution, the inner side wall of each of the coil slots is an inwards-concave arc surface.

In the above-mentioned solution, the rotor core includes twelve coil slots, three induction coils are provided and are respectively wound in the ten adjacent coil slots, and incoming lines and outgoing lines of the three induction coils are sequentially staggered for one coil slot.

In the above-mentioned solution, the rotating object is a wheel of a vehicle.

The generator mounted on the rotating object in the embodiment of the present disclosure includes a rotor mounted and fixedly arranged on the rotating object, and the rotor including at least one induction coil; a stator capable of rotating relative to the rotor, and the stator including at least two magnetic poles; the stator including a stator shell and a balancing weight, and the stator shell encircling the rotor from the circumferential direction of the rotor and being closed in the circumferential direction; and the balancing weight being fixedly arranged at one side of the stator shell, and the angle range of the balancing weight in the circumferential direction being smaller than or equal to 180 DEG Apparently, due to the arrangement of one balancing weight on the stator of the generator mounted on the rotating object in the embodiment of the present disclosure, when the rotating object rotates, the stator is kept still to ensure that the generator normally works so as to be capable of continuously and reliably supplying power to an electronic product on the rotating object.

Other beneficial effects of the embodiment of the present disclosure will be further described in specific implementation manners in combination with specific technical solutions.

BRIEF DESCRIPTION OF DRAWINGS

To describe technical solutions of embodiments of the present disclosure more clearly, accompanying drawings required for describing the embodiments will be briefly introduced below. It should be understood that the accompanying drawings in the following description are only a part of accompanying drawings of the embodiments of the present disclosure, and the ordinary skill in the art can still derive other accompanying drawings according to these accompanying drawings without creative efforts.

DETAILED DESCRIPTION

Figure 1:
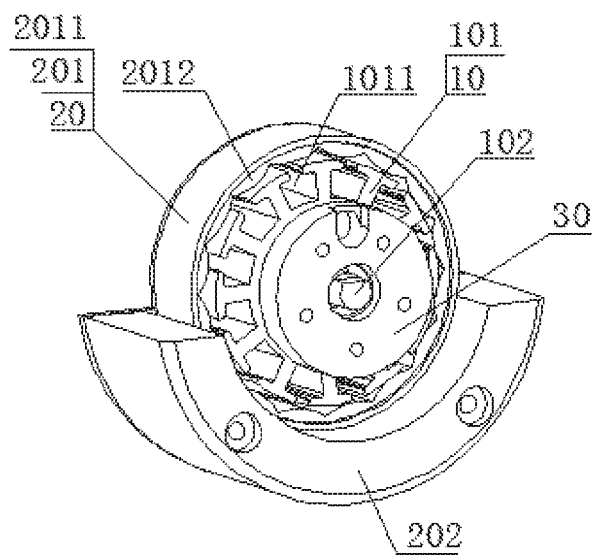
FIG. 1 is a schematic diagram of a generator mounted on a wheel in an embodiment of the present disclosure.

An embodiment of the present disclosure provides a generator mounted on a rotating object, and the generator may include:

a rotor mounted and fixedly arranged on the rotating object, and the rotor including at least one induction coil;

a stator capable of rotating relative to the rotor, and the stator including at least two magnetic poles;

the stator including a stator shell and a balancing weight, and the stator shell encircling the rotor from the circumferential direction of the rotor and being closed in the circumferential direction; the balancing weight being fixedly arranged at one side of the stator shell, and the angle range of the balancing weight in the circumferential direction being smaller than or equal to 180 DEG; and when the rotating object rotates, the rotor rotating with the rotation of the rotating object, while the stator being kept still under the action of the gravity of the balancing weight.

Due to the arrangement of one balancing weight on the stator of the generator mounted on the rotating object in the embodiment of the present disclosure, when the rotating object rotates, the stator is kept still to ensure that the generator normally works so as to be capable of continuously and reliably supplying power to an electronic product on the rotating object.

The rotating object herein mainly refers to an object rotating in a vertical direction, such as a wheel of a vehicle, thus the gravity of the balancing weight of the stator may play the maximum role. Of course, the rotating object herein is not limited to the object rotating in the vertical direction and may also be an object which rotates obliquely and even rotates in a horizontal direction if the rotating speed is not high.

Further, the stator is kept still under the action of the gravity of the balancing weight, which means that the stator does not within most of the time or may rotate within short time at the moment when the wheel starts to rotate or under the condition such as abrupt acceleration or road bumpiness, however, the generation function is not affected under this condition.

In some other embodiments of the present disclosure, the balancing weight may be made of a tungsten alloy. The tungsten alloy is capable of generating a higher gravity due to relatively high specific gravity so as to make the stator more stable. More specifically, the balancing weight may be made of a high-density tungsten alloy which is made by adding a small number of elements such as Ni, Co and Mo into W serving as a matrix, is a typical two-phase alloy and is also known as a high-specific-gravity tungsten alloy. It can be understood by those skilled in the art that the balancing weight may also be made of other materials with high specific gravity.

In some other embodiments of the present disclosure, the stator shell may include a base ring and at least two magnetic pole blocks, and the magnetic pole blocks are uniformly and fixedly arranged on the inner wall of the base ring via a binder. More magnetic poles can generate more magnetic lines of force, and an overall magnetic ring is divided into a plurality of magnetic pole blocks to be respectively manufactured, so that the implementation processability is better, and the implementation manner is better. Specifically, the base ring may be made of a cold-rolled silicon steel sheet with high magnetic conductivity.

In some other embodiments of the present disclosure, the magnetic pole blocks may be distributed on the inner wall of the base ring in a wave shape, and each wave peak in the wave shape includes one magnetic pole block; and the magnetic pole blocks are uniformly distributed on the circumference of the inner wall of the base ring. The design of the wave shape can adapt to the induction of the induction coils, and therefore, the implementation manner is better.

In some other embodiments of the present disclosure, the magnetic pole blocks are made of NdFeB. The magnetic energy product of NdFeB is relatively large, namely NdFeB is capable of generating a larger magnetic field within a unit volume, so that the generating efficiency of the generator is higher, and the implementation manner is better.

In some other embodiments of the present disclosure, the induction coils may be made of pure copper conductors. The electric conductivity of the pure copper conductors is higher, so that the heat generating capacity of the generator can be reduced, and the implementation manner is better.

In some other embodiments of the present disclosure, the rotor may further include a rotor core, the rotor core includes at least two coil slots for accommodating the induction coils, each of the induction coils is wound in two or more adjacent coil slots, and the number of the coil slots corresponds to the number of the magnetic pole blocks; and the inner side wall of each of the coil slots is an inwards-concave arc surface. Herein, the arc surfaces inside the coil slots play a role in gathering the conductors of the coils, so that turns of the coils are closer and magnetic flux leakage is little, and the implementation manner is better.

In some other embodiments of the present disclosure, the rotor core may include twelve coil slots, three induction coils are provided and are respectively wound in ten adjacent coil slots, and incoming lines and outgoing lines of the three induction coils are sequentially staggered for one coil slot; in this way, the current directions of the three induction coils are different, namely the three induction coils are a three-phase alternating current. The three-phase alternating current is a widely used electric energy manner and is easier for conversion and transmission, and the implementation manner is better.

In some other embodiments of the present disclosure, the generator is further provided with a bearing, the rotor further includes a rotor shaft, the inner ring of the bearing is fixedly arranged on the rotating shaft, and the outer ring of the bearing is fixedly arranged on the stator. In this way, the rotor rotates more smoothly, and the implementation manner is better.

In some other embodiments of the present disclosure, the rotating object may be a wheel of a vehicle. There are various vehicles in modern society, and the speeds of the vehicles are also very high, and therefore, the implementation manner is better.

The present disclosure is further described in detail below in combination with the accompanying drawings and specific embodiments. It should be understood that the embodiments described herein are only used for explaining the present disclosure, and are not used for limiting the present disclosure. Moreover, the embodiments described below are only some embodiments instead of all embodiments of the present disclosure. All other embodiments obtained by the ordinary skill in the art based on the embodiments of the present disclosure without creative effects shall fall within the protection scope of the present disclosure.

The present embodiment provides a generator mounted on a wheel, but it can be understood by those skilled in the art that the generator in the present embodiment may also be mounted on other rotating objects.

Figure 2:
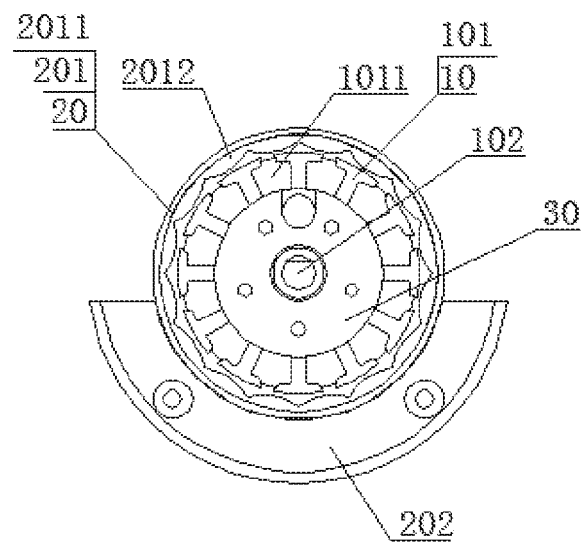
FIG. 2 is a schematic diagram of a front projection in FIG. 1.
Figure 3:
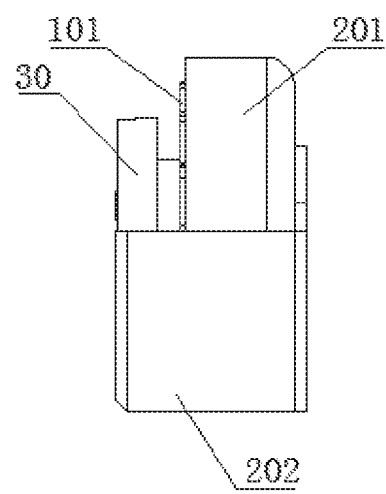
FIG. 3 is a schematic diagram of a side projection in FIG. 1.
Figure 4:
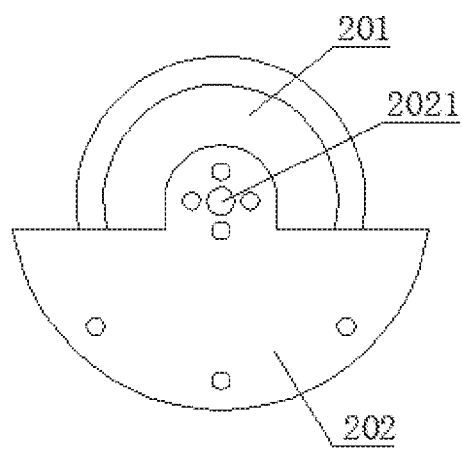
FIG. 4 is a schematic diagram of a rear projection in FIG. 1.
Figure 5:
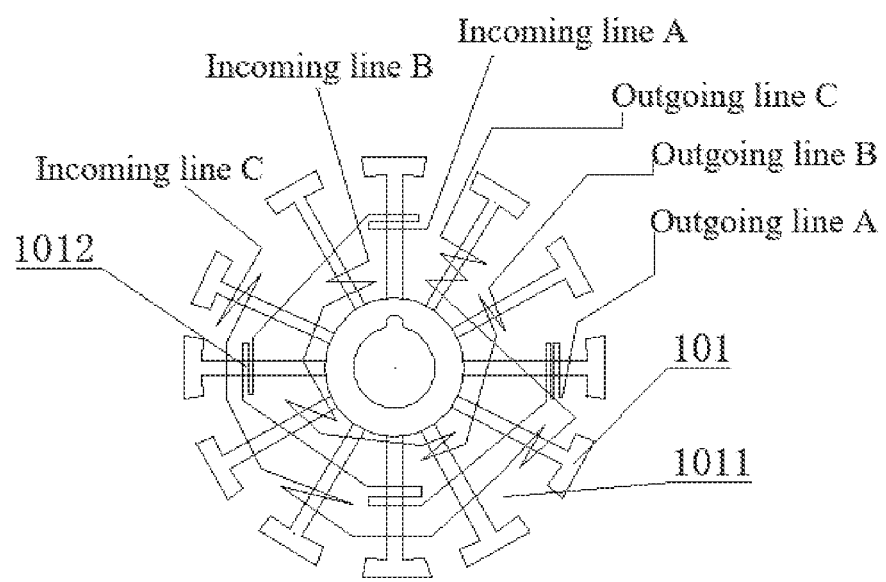
FIG. 5 is a schematic diagram of a rotor core in the generator mounted on the wheel in the embodiment of the present disclosure.

As shown in FIG. 1 to FIG. 4, the generator mounted on the wheel includes a rotor 10 and a stator 20. The rotor 10 is mounted and fixedly arranged on the wheel (not shown in the figure), and the rotor 10 includes three induction coils. The stator 20 is capable of rotating relative to the rotor 10, and the rotation center is the axis of the rotor 10.

The stator 20 includes twelve magnetic pole blocks, namely a plurality of magnetic lines of force can be formed. The stator 20 includes a stator shell 201 and a balancing weight 202, the stator shell 201 encircles the rotor 10 from the circumferential direction of the rotor 10 and is closed in the circumferential direction; and the balancing weight 202 is fixedly arranged at one side of the stator shell 201, and the angle range of the balancing weight 202 in the circumferential direction is 180 DEG.

It can be understood by those skilled in the art that the number of the above-mentioned induction coils, the number of the magnetic pole blocks and the angle range of the balancing weight 202 in the circumferential direction are not limited to those as mentioned above in other embodiments of the present disclosure.

The balancing weight 202 is made of a tungsten alloy. In this way, a higher gravity can be generated to make the stator 20 more stable.

The stator shell includes a base ring 2011 and twelve magnetic pole blocks 2012, and the magnetic pole blocks 2012 are uniformly and fixedly arranged on the inner wall of the base ring 2011 via a binder. The magnetic pole blocks 2012 are distributed on the inner wall of the base ring in a wave shape, and each wave peak in the wave shape includes one magnetic pole block 2012; and the magnetic pole blocks 2012 are uniformly distributed on the circumference of the inner wall of the base ring.

The magnetic pole blocks 2012 are made of NdFeB. A stronger magnetic field is generated, so that the generating efficiency can be increased.

The rotor further includes a rotor core 101, the rotor core 101 includes twelve coil slots 1011. Each of the induction coils 1012 is wound in ten adjacent coil slots 1011, incoming lines and outgoing lines of the three induction coils 1012 are sequentially staggered for one coil slot, the three induction coils 1012 are respectively A, B and C, and the induction coils 1012 are provided with the incoming lines and the outgoing lines, and therefore, the incoming lines and the outgoing lines are respectively an incoming line A, an outgoing line A, an incoming line B, an outgoing line B, an incoming line C and an outgoing line C. Specifically, the inner side wall of each of the coil slots 1011 is a circumferentially and inwards bent arc surface, so that turns of the coils are closer and magnetic flux leakage is little.

The induction coils 1012 are made of pure copper conductors. The electric conductivity of the pure copper conductors is higher, so that the heat generating capacity of the generator can be reduced.

The generator is further provided with a bearing 30, the rotor 10 further includes a rotor shaft 102, the inner ring of the bearing 30 is fixedly arranged on the rotating shaft 102, and the outer ring of the bearing 30 is fixedly arranged on the stator 20 (a fixing structure is not shown in the figure). Specifically, the back of the balancing weight 202 is further provided with a shaft hole 2021 for supporting the rotor shaft 102.

The invention claimed is:

1. A generator mounted on a rotating object, wherein the generator comprises:
    a rotor mounted and fixedly arranged on the rotating object, and the rotor comprising at least one induction coil;
    a stator capable of rotating relative to the rotor, and the stator comprising at least two magnetic poles;
    the stator comprising a stator shell and a balancing weight, the stator shell comprising a base ring and at least two magnetic pole blocks, the magnetic pole blocks being uniformly and fixedly arranged on an inner wall of the base ring via a binder, the stator shell encircling the rotor from a circumferential direction of the rotor and being closed in the circumferential direction, the balancing weight being fixedly arranged at one side of the stator shell, and an angle range of the balancing weight in the circumferential direction being smaller than or equal to 180 DEG; and
    when the rotating object rotates, the rotor rotating with rotation of the rotating object, while the stator is kept still under an action of gravity of the balancing weight.

2. The generator mounted on the rotating object according to claim 1, wherein the balancing weight is made of a tungsten alloy.

3. The generator mounted on the rotating object according to claim 1, wherein the magnetic pole blocks are distributed on the inner wall of the base ring in a wave shape, each wave peak in the wave shape comprises one magnetic pole block, and the magnetic pole blocks are uniformly distributed on a circumference of the inner wall of the base ring.

4. The generator mounted on the rotating object according to claim 3, wherein the magnetic pole blocks are made of NdFeB.

5. The generator mounted on the rotating object according to claim 4, wherein the induction coils are made of pure copper conductors.

6. The generator mounted on the rotating object according to claim 5, wherein the rotor further comprises a rotor core, the rotor core comprises at least two coil slots for accommodating the induction coils, each of the induction coils is wound in two or more adjacent coil slots, and the number of the coil slots corresponds to the number of the magnetic pole blocks.

7. The generator mounted on the rotating object according to claim 6, wherein an inner side wall of each of the coil slots is an inwards-concave arc surface.

8. The generator mounted on the rotating object according to claim 7, wherein the rotor core comprises twelve coil slots, three induction coils are provided and are respectively wound in ten adjacent coil slots, and incoming lines and outgoing lines of the three induction coils are sequentially staggered for one coil slot.

9. The generator mounted on the rotating object according to claim 8, wherein the rotating object is a wheel of a vehicle.

* * * * *